(12) United States Patent  (10) Patent No.: US 9,428,163 B2
Breuer et al.  (45) Date of Patent: Aug. 30, 2016

(54) AUTONOMOUS VEHICLE EMERGENCY BRAKING METHOD

(75) Inventors: Karsten Breuer, Lauenau (DE);
Thomas Dieckmann, Pattensen (DE);
Guido Hoffmann, Burgwedel (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 13/377,972

(22) PCT Filed: May 3, 2010

(86) PCT No.: PCT/EP2010/002670
§ 371 (c)(1),
(2), (4) Date: Dec. 13, 2011

(87) PCT Pub. No.: WO2011/003487
PCT Pub. Date: Jan. 13, 2011

(65) Prior Publication Data
US 2012/0095660 A1   Apr. 19, 2012

(30) Foreign Application Priority Data

Jul. 9, 2009 (DE) .......................... 10 2009 032 314

(51) Int. Cl.
*B60T 7/22* (2006.01)
*B60T 7/18* (2006.01)
(Continued)

(52) U.S. Cl.
CPC .................. *B60T 8/172* (2013.01); *B60T 7/18* (2013.01); *B60T 7/22* (2013.01); *B60T 2201/02* (2013.01);
(Continued)

(58) Field of Classification Search
CPC ........ B60T 7/18; B60T 7/22; B60T 8/17558; B60T 8/442; B62D 15/0265; B60N 2/2863; B60W 30/04; B60W 40/02; B60W 40/103; B60R 21/013; G05D 1/0251; B60L 3/10; B60L 5/005
USPC ....... 701/70, 301, 408, 498, 22, 28, 82, 428; 104/88.01; 382/104; 303/9, 193, 303/122.09; 340/995.1
See application file for complete search history.

(56) References Cited

U.S. PATENT DOCUMENTS 5,081,585 A * 1/1992 Kurami ................ G05D 1/0251
180/168
6,129,025 A * 10/2000 Minakami ............... B60L 5/005
104/288

(Continued)

FOREIGN PATENT DOCUMENTS

DE  36 37 165  5/1988
DE  44 44 223  6/1996

(Continued)

OTHER PUBLICATIONS

On the Relativistic Doppler Effects and High Accuracy Velocity Determination Using GPS; Jason Zhang, Kefei Zhang and Ron Grenfell; Dec. 6-8, 2004.

(Continued)

*Primary Examiner* — Yuri Kan
(74) *Attorney, Agent, or Firm* — Kramer Levin Naftalis & Frankel LLP

(57) ABSTRACT

A method for autonomous emergency braking in a road vehicle to avoid or reduce the severity of an accident includes measuring the speed of the vehicle during autonomous emergency braking and additionally determining vehicle speed independent of the wheel rotational speeds of the vehicle. In this way, the vehicle speed can be determined sufficiently accurately even in the cases in which, as a result of sharp autonomous braking, the vehicle speed is higher than the wheel rotational speeds.

13 Claims, 1 Drawing Sheet

(51) Int. Cl.
 *B60R 21/013* (2006.01)
 *B60T 8/172* (2006.01)
(52) U.S. Cl.
 CPC ....... *B60T 2201/024* (2013.01); *B60T 2210/36* (2013.01); *B60T 2250/04* (2013.01); *B60T 2270/413* (2013.01)

(56) References Cited

U.S. PATENT DOCUMENTS

| | | | |
|---|---|---|---|
| 6,254,202 B1* | 7/2001 | Kawamoto | B60T 7/22 303/116.2 |
| 6,523,912 B1* | 2/2003 | Bond, III | B60R 21/013 303/9 |
| 6,604,592 B2 | 8/2003 | Pietsch et al. | |
| 7,477,760 B2* | 1/2009 | Sawada | B60W 40/02 382/104 |
| 7,948,613 B2 | 5/2011 | Fourcault et al. | |
| 8,040,248 B2 | 10/2011 | Fridthjof | |
| 2005/0060069 A1* | 3/2005 | Breed | B60N 2/2863 701/408 |
| 2005/0203705 A1 | 9/2005 | Izumi et al. | |
| 2009/0063036 A1* | 3/2009 | King et al. | 701/207 |
| 2009/0192687 A1* | 7/2009 | Zagorski | B60T 7/22 701/70 |
| 2009/0192710 A1* | 7/2009 | Eidehall | B62D 15/0265 701/301 |
| 2010/0256887 A1* | 10/2010 | Linda | B60L 3/10 701/82 |
| 2011/0295457 A1* | 12/2011 | Linda et al. | 701/29 |
| 2012/0095660 A1* | 4/2012 | Breuer et al. | 701/70 |

FOREIGN PATENT DOCUMENTS

| | | |
|---|---|---|
| DE | 198 31 262 | 1/2000 |
| DE | 10 2004 022 289 | 12/2005 |
| DE | 601 21 309 T2 | 5/2007 |
| DE | 10 2007 002 754 | 11/2007 |
| DE | 60 2004 009 422 | 11/2007 |
| DE | 10 2007 027 644 A1 | 12/2007 |
| DE | 602 18 294 T2 | 3/2008 |
| DE | 10 2006 047 131 A1 | 4/2008 |
| DE | 10 2008 034 229 | 4/2009 |
| DE | 10 2008 045 481 A1 | 5/2009 |
| DE | 10 2007 058 192 A1 | 6/2009 |
| EP | 0 972 679 B1 | 1/2000 |
| EP | 1 419 947 | 5/2004 |
| EP | 1 964 736 | 9/2008 |
| FR | 2 891 912 | 4/2007 |
| GB | 2 406 948 | 4/2005 |
| JP | 2005014791 | 1/2005 |
| JP | 2006103495 | 4/2006 |
| JP | 2007302041 | 11/2007 |
| JP | 2008018923 | 1/2008 |
| JP | 2009500243 | 1/2009 |
| JP | 2009511866 | 3/2009 |
| WO | WO 2007/009843 A1 | 1/2007 |
| WO | WO 2007/042435 A | 4/2007 |

OTHER PUBLICATIONS

High Accuracy Speed Measurement Using GPS; Tom J. Chalko, 2007.

* cited by examiner

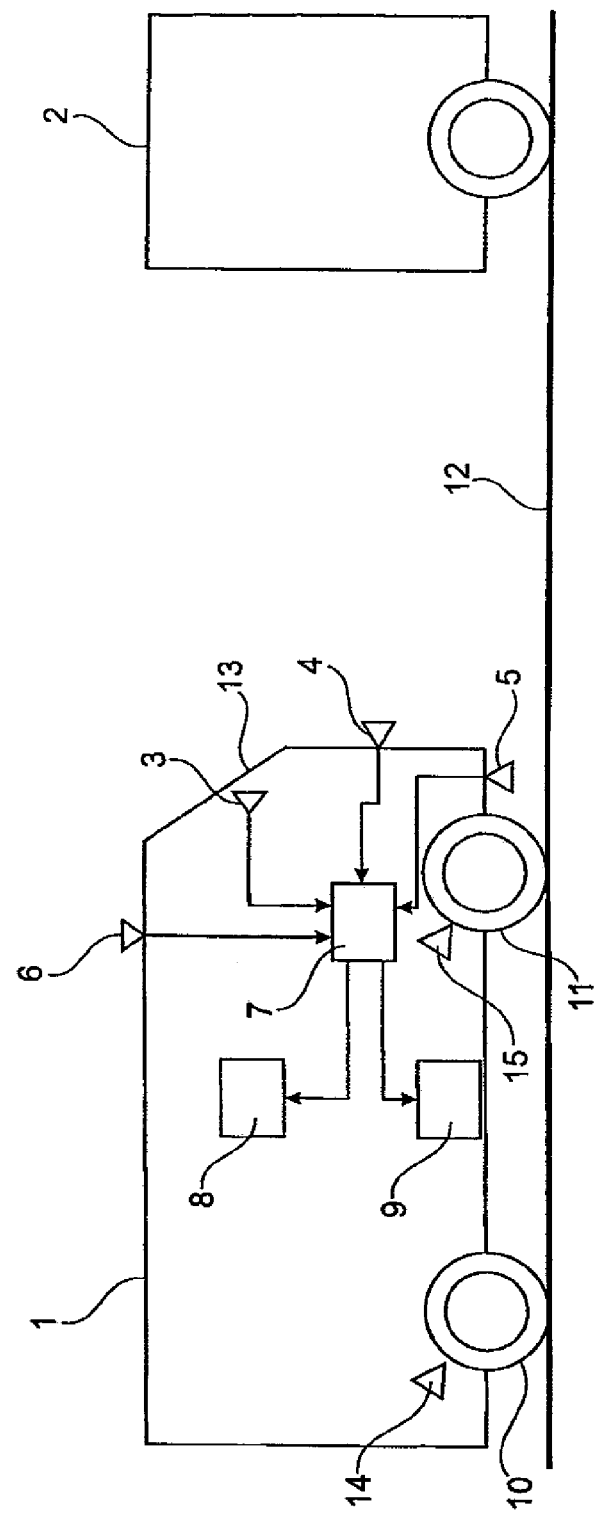

AUTONOMOUS VEHICLE EMERGENCY BRAKING METHOD

FIELD OF THE INVENTION

The present invention generally relates to a method for correctly carrying out autonomous emergency braking in a road vehicle.

BACKGROUND OF THE INVENTION

Autonomous emergency braking in a road vehicle, in particular in a utility vehicle, is understood to be a braking process that is started automatically without the driver's involvement. As a result, accidents, in particular rear end accidents, should either be entirely prevented or their consequences mitigated (CMS Collision Mitigation System). Known systems of this type (DE 3637165 A1, DE 10 2008 034 229 A1) use sensors, for example RADAR or video cameras, to sense the space in front of the vehicle equipped with the system. A hazard potential is determined on the basis of the known speed of the vehicle in question, determined by means of the wheel speeds, and the speed of the vehicle traveling in front and the distance from that vehicle, wherein the distance data are acquired by means of the RADAR sensor. Of course, the hazard is then particularly high if the distance between the two vehicles decreases rapidly and the distance is below various threshold values. Furthermore, it is known also to take into account the weather or ice on the road for the hazard potential (DE 10 2004 022 289 A1).

If the specified hazard potential has exceeded a specific threshold, a warning tone is generated in the vehicle, the warning tone being intended to signal the imminent danger to the driver who is possibly inattentive at that particular time.

If the hazard potential exceeds a further threshold, autonomous partial braking of the vehicle can be initiated. This means that the vehicle's brakes are activated with medium force without the driver's involvement.

If the hazard potential exceeds a maximum level, autonomous full braking can be initiated (DE 10 2008 034 229 A1), in which the vehicle's brakes are activated with maximum force without the driver's involvement. Even if an imminent accident can no longer be prevented by this, the consequences of the accident are nevertheless greatly reduced by the dissipation of the kinetic energy of the vehicle in question.

In such autonomous braking operations the wheels of the vehicle in question may enter a slipping state, in particular at high deceleration values or under unfavorable weather conditions, that is, ice on the road. In this context, an ABS (anti-lock brake system) in the vehicle may be activated and temporarily relieve the brake pressure on individual wheels. At any rate, this state results in a situation in which a precise vehicle speed can no longer be determined by means of the wheel speeds since the wheel speeds no longer correspond to the vehicle speed owing to the slip. However, as a result it is also no longer possible to precisely determine the speed of the front vehicle whose distance is measured by a distance sensor usually a RADAR sensor. The same applies if the wheel speeds are not used to determine the speed of the vehicle in question and the speed of the front vehicle but rather the output speeds of the transmission are used.

As a result of the described issues in determining the vehicle speed, it is possible, under certain circumstances, for incorrect evaluations of the accident hazard to occur, which can lead to incorrect premature ending of the emergency braking intervention if the speed of the vehicle in question is incorrectly measured as being too low.

SUMMARY OF THE INVENTION

Generally speaking, it is therefore an object of the present invention to enable precise determination of the speed of the vehicle in question during an ongoing emergency braking intervention.

In accordance with an embodiment of the present invention, vehicle speed is measured using wheel speed sensors during autonomous emergency braking, the roadway in front of the vehicle is monitored, e.g., at least by means of a distance sensor, and vehicle speed is additionally determined independently of the wheel speeds. This is salutary as the speed of the vehicle can be reliably determined during autonomous braking even under unfavorable circumstances.

Still other objects and advantages of the present invention will in part be obvious and will in part be apparent from the specification.

The present invention accordingly comprises the various steps and the relation of one or more of such steps with respect to each of the others, all as exemplified in the embodiments herein set forth, and the scope of the invention will be indicated in the claims.

BRIEF DESCRIPTION OF THE DRAWINGS

The invention will be explained in more detail below with reference to an embodiment depicted in the accompanying drawing in which:

FIG. 1 schematically illustrates a road vehicle capable of effecting a method for autonomous emergency braking according to an embodiment of the present invention.

DETAILED DESCRIPTION OF THE PREFERRED EMBODIMENTS

FIG. 1 is a schematic illustration of a road vehicle 1 on a road surface 12. A front vehicle 2 is located in front of the road vehicle 1.

The vehicle 1 has rear wheels 10 and front wheels 11. They are equipped in a manner known per se with wheel speed sensors (14, 15), which pass on their signals to vehicle electronics, for example an ABS (not illustrated). Of the total of four wheel speed sensors, only two are shown here.

The illustrated vehicle 1 also has an electronic CMS (Collision Mitigation System) 7. This serves, in a manner known per se, to detect hazardous driving situations and to perform autonomous braking of the vehicle 1 if such a situation has been detected and the driver does not react quickly enough.

For this purpose, the CMS has, inter alia, a distance sensor 4 that detects the distance from the vehicle 2 in front and signals it to the electronic system 7. Suitable known sensor systems such as, for example, RADAR or LIDAR, can be used as distance sensors.

In order to redundantly detect the vehicle in front 2 or other obstacles, a video camera 3 is used, which is mounted behind a windscreen 13. The signals of the video camera 3 are also passed on to the electronic system 7 of the CMS. The electronic system 7 can, if appropriate, evaluate the signals of the video camera 3 and those of the distance sensor 4 in combination in a known fashion by means of a suitable program (sensor fusion).

In order to determine the speed of the vehicle 1, the CMS electronic system 7 is supplied with the above-mentioned wheel speed signals of the front wheels 11 and of the rear wheels 10. These are sensed in a known fashion by the wheel sensors (14, 15).

Since, as explained above, under unfavorable circumstances the wheel speeds do not model the vehicle speed precisely enough, according to the embodiments of the invention the vehicle speed is additionally determined by methods that are independent of the wheel speeds.

For the additional determination of the vehicle speed of the road vehicle 1, an optical sensor 5 is advantageously provided, which is mounted under the vehicle 1 and scans the road surface 12 in a contactless fashion. Such sensors are known, for example, from DE 60 2004 009 422 T2, EP 1 964 736 A1, and DE 44 44 223 C5. They illuminate the road surface, for example with a laser beam, and evaluate the reflected light. The specified sensors are, on the one hand, capable of detecting the road surface to determine whether it is dry, wet, covered in snow or covered in ice. However, they can also determine the speed of the vehicle 1 with respect to the road surface 12.

Furthermore, the vehicle speed can advantageously be determined by means of a GPS sensor 6. With the latter it is possible to determine the position of the vehicle and therefore also its speed. The signals of the GPS sensor 6 are also fed to the electronic system 7.

Since determination of the speed by means of a GPS sensor is normally not precise or quick enough, it is advantageous also to evaluate the phase shifts of the carrier frequencies of the GPS by means of the electronic system 7. Such a method is described, for example, in the paper "On the relativistic Doppler Effects and high accuracy velocity determination using GPS", presented at GNSS 2004, The 2004 International Symposium on GNSS/GPS.

The vehicle speed can advantageously also be determined from the images of the video camera 3. For this purpose, image details that are associated with fixed objects, for example lane markings or road boundary pillars, are detected and evaluated by a suitable evaluation program.

The vehicle speed can also be advantageously determined from the signals of the distance sensor 4. In this context, for example in the case of a RADAR sensor, those RADAR echoes originating from fixed objects, for example trees or roadway boundary pillars at the edge of the road, are evaluated by means of a suitable program.

In the CMS electronic system 7, the input signals of the additional sensors 3, 5, 6, which are described above, are evaluated in a manner known per se and a vehicle speed is calculated therefrom. In this context, the signals of various sensors can also be combined (sensor fusion) in order to obtain a reliable signal.

A hazard potential is calculated from the sensor data, as mentioned above within the CMS electronic system 7. If this hazard potential exceeds certain thresholds, a warning display 8 is activated, which is located in the driver's cab and is intended to make a possibly inattentive driver aware of a hazardous driving situation. The warning can be issued optically, acoustically or haptically.

If prompt reaction by the driver in order to prevent a rear end accident no longer takes place or is no longer possible, a brake system 9 of the vehicle is actuated simultaneously or subsequently. The brake system 9 is able to brake the vehicle 1 autonomously, i.e., without activation of a brake pedal by the driver. This braking operation can be partial braking or full braking.

The method according to the inventive embodiments has the advantage that, in order to assist the wheel speed signals, the vehicle speed is additionally also monitored by means of further sensors that are independent of the wheel speed. As a result, the speed of the vehicle can be reliably determined during autonomous braking even under unfavorable circumstances.

It will be seen that the objects set forth above, among those made apparent from the preceding description, are efficiently attained, and since certain changes may be made without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A method for autonomous emergency braking in a road vehicle, the method comprising the steps of:
   determining a roadway sped of the vehicle based on wheel speeds measured using wheel sensors of the vehicle;
   detecting, using a collision mitigation electronic system, a potential hazard to the vehicle;
   effecting, by the collision mitigation electronic system, autonomous emergency braking of the vehicle in response to the detected hazard; and
   during the autonomous emergency braking of the vehicle:
      monitoring the space in front of the vehicle using at least one distance sensor of the vehicle;
      determining, using the collision mitigation electronic system, the roadway speed of the vehicle independently of the wheel speeds measured using the wheel sensors by evaluating signals of the at least one distance sensor; and
      controlling the autonomous emergency braking of the vehicle by operating the collision mitigation electronic system based at least in part on the roadway speed of the vehicle determined by evaluating the signals of the at least one distance sensor to avoid incorrect evaluation of the detected hazard and premature termination of the autonomous emergency braking that might otherwise occur if the collision mitigation electronic system were operated exclusively based on the roadway speed determined based on the wheel speeds measured using the wheel sensors.

2. The method as claimed in claim 1, wherein the at least one distance sensor comprises a RADAR sensor.

3. The method as claimed in claim 1, wherein the at least one distance sensor comprises a LIDAR sensor.

4. The method as claimed in claim 1, wherein the monitoring step is further effected using a video camera.

5. The method as claimed in claim 1, wherein the step of determining the roadway speed of the vehicle is further effected using an optical sensor mounted on the vehicle, the optical sensor being configured to scan the vehicle roadway in a contactless manner.

6. The method as claimed in claim 1, wherein the step of determining the roadway speed of the vehicle is further effected using a GPS sensor.

7. The method as claimed in claim 6, further comprising the step of evaluating phase shifts of carrier frequencies of GPS signals.

8. The method as claimed in claim 4, wherein the step of determining the roadway speed of the vehicle includes evaluating the images of the video camera.

9. A road vehicle, equipped to effect a method for autonomous emergency braking, the method comprising the steps of:
determining a roadway speed of the vehicle based on wheel speeds measured using wheel sensors of the vehicle;
detecting, using a collision mitigation electronic system, a potential hazard to the vehicle;
effecting, by the collision mitigation electronic system, autonomous emergency braking of the vehicle in response to the detected hazard; and
during the autonomous emergency braking of the vehicle:
monitoring the space in front of the vehicle using at least one distance sensor of the vehicle;
determining, using the collision mitigation electronic system, the roadway speed of the vehicle independently of the wheel speeds measured using the wheel sensors by evaluating signals of the at least one distance sensor; and
controlling the autonomous emergency braking of the vehicle by operating the collision mitigation electronic system based at least in part on the roadway speed of the vehicle determined by evaluating the signals of the at least one distance sensor to avoid incorrect evaluation of the detected hazard and premature termination of the autonomous emergency braking that might otherwise occur if the collision mitigation electronic system were operated exclusively based on the roadway speed determined based on the wheel speeds measured using the wheel sensors.

10. A method for autonomous braking in a road vehicle, the method comprising the steps of:
determining a roadway speed of the vehicle based on wheel speeds measured using wheel sensors of the vehicle;
detecting, using a collision mitigation electronic system, a potential hazard to the vehicle;
effecting, by the collision mitigation electronic system, autonomous emergency braking of the vehicle in response to the detected hazard; and
during the autonomous emergency braking of the vehicle:
monitoring the space in front of the vehicle using at least one distance sensor and at least one video camera of the vehicle;
determining, using the collision mitigation electronic system, the roadway speed independently of the wheel speeds measured using the wheel sensors based on information transmitted by the at least one distance sensor and images from the at least one video camera; and
controlling the autonomous emergency braking of the vehicle by operating the collision mitigation electronic system based at least in part on the roadway speed of the vehicle determined based on information transmitted by the at least one distance sensor and images from the at least one video camera to avoid incorrect evaluation of the detected hazard and premature termination of the autonomous emergency braking that might otherwise occur if the collision mitigation electronic system were operated exclusively based on the roadway speed determined based on the wheel speeds measured using the wheel sensors.

11. The method as claimed in claim 10, wherein the step of determining the roadway speed of the vehicle is further effected using information transmitted by at least one of an optical sensor and a GPS sensor.

12. A method for autonomous emergency braking in a road vehicle, the method comprising the steps of:
determining a roadway speed of the vehicle based on wheel speeds measured using wheel sensors of the vehicle;
detecting, using a collision mitigation electronic system, a potential hazard to the vehicle;
effecting, by the collision mitigation electronic system, autonomous emergency braking of the vehicle in response to the detected hazard; and
during the autonomous emergency braking of the vehicle:
monitoring the space in front of the vehicle using at least one distance sensor of the vehicle;
determining, using the collision mitigation electronic system, the roadway speed of the vehicle independently of the wheel speeds measured using the wheel sensors by evaluating signals of the at least one distance sensor that originate from a plurality of fixed objects; and
controlling the autonomous emergency braking the vehicle by operating the collision mitigation electronic system based at least in part on the roadway speed of the vehicle determined by evaluating the signals of the at least one distance sensor to avoid incorrect evaluation of the detected hazard and premature termination of the autonomous emergency braking that might otherwise occur if the collision mitigation electronic system were operated exclusively based on the roadway speed determined based on the wheel speeds measured using the wheel sensors.

13. The method as claimed in claim 12, wherein the plurality of fixed objects comprises at least one of trees and roadway boundary pillars.

* * * * *